US005411331A

United States Patent [19]

Griffin

[11] Patent Number: 5,411,331

[45] Date of Patent: May 2, 1995

[54] DEVICE FOR PROMOTING GRAVITY FLOW OF NON-FREE-FLOWING SOLIDS

[75] Inventor: Rodney L. Griffin, Kaysville, Utah

[73] Assignee: Westinghouse Electric Corporation, Pittsburgh, Pa.

[21] Appl. No.: 69,488

[22] Filed: Jun. 1, 1993

[51] Int. Cl.$^{6}$ .......................... B01F 7/00; B65G 1/00; G01F 11/20

[52] U.S. Cl. .................................... 366/286; 366/308; 414/288; 222/240; 222/228; 222/410

[58] Field of Search ............... 414/288, 301, 287, 304, 414/324, 327; 366/607, 308, 286, 289; 222/227, 228, 240, 310, 342, 410–413, 559, 561

[56] References Cited

U.S. PATENT DOCUMENTS

| | | | |
|---|---|---|---|
| 292,590 | 1/1884 | Schafhaus | 366/308 |
| 697,579 | 4/1890 | Wehmeier et al. | 366/308 |
| 955,978 | 4/1910 | Mitchell | 366/308 |
| 1,218,623 | 3/1917 | Brillhart | 366/308 |
| 2,228,421 | 1/1941 | Taylor | 222/228 |
| 2,561,258 | 7/1951 | Wolf et al. | 222/410 |
| 3,037,713 | 6/1962 | Carroll | 414/304 |
| 3,132,850 | 5/1964 | Puchalski | 366/308 |
| 3,424,350 | 1/1969 | Herr et al. | 222/240 |

FOREIGN PATENT DOCUMENTS

| | | | |
|---|---|---|---|
| 2433475 | 4/1980 | France | 222/227 |
| 192886 | 4/1906 | Germany | 366/308 |
| 369632 | 3/1921 | Germany | 366/286 |
| 1055695 | 11/1983 | U.S.S.R. | 222/228 |

*Primary Examiner*—David A. Bucci
*Assistant Examiner*—R. B. Johnson

[57] ABSTRACT

A device for promoting gravity flow of zirconium tetrachloride and other non-free-flowing solids has a rotatable shaft. At least two flexible lengths have first ends attached to and axially spaced on the shaft and also distal second ends. A collar is slidably mounted on the shaft between the spaced first ends of the flexible lengths for slidable axial and circumferential movement on the shaft. At least one sweep arm has a first end pivotally attached to the collar and a second distal end attached to the second distal ends of the flexible lengths. The collar slides relative to the shaft as the sweep arm encounters resistance from bridged solids. The relative movement of the collar and shaft causes the flexible lengths to wrap around the shaft and the arms to collapse toward the shaft. A device with collapsible arms will have a minimal torque requirement. When the solids dislodge from the collapsed sweep arms, the arms extend to sweep outwardly to a maximum extent.

6 Claims, 1 Drawing Sheet

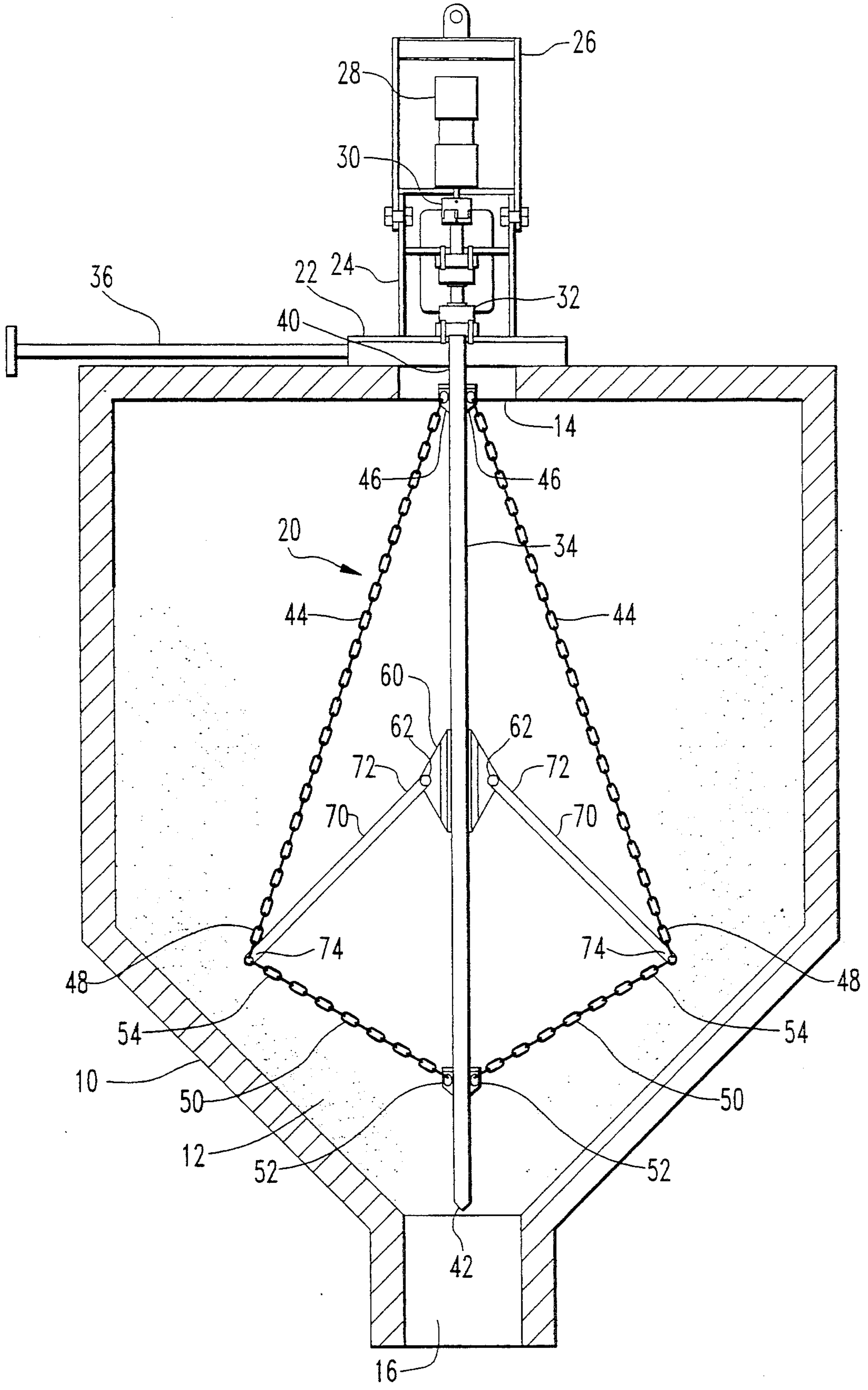
26
28
30
36
22
24
32
40
14
46
46
20
34
44
44
60
62
62
72
72
70
70
48
74
74
48
54
54
10
50
50
12
52
52
42
16

DEVICE FOR PROMOTING GRAVITY FLOW OF NON-FREE-FLOWING SOLIDS

BACKGROUND OF THE INVENTION

The present invention relates to a device for promoting the gravity flow of sticky, light powders and other non-free-flowing solids.

In many commercial production processes, light, sticky, hydroscopic non-free-flowing powders tend to bridge in bins, processing vessels, pipes, ducts and other containers. In such cases, the bridged solids must be dug out either mechanically or manually, depending upon the application.

Thus, for example, in the commercial production of zirconium metal from zirconium-containing zircon sand, the zircon sand is carbochlorinated at temperatures of up to about 1000° C. or more to produce a zirconium tetrachloride-containing gas. The gas is cooled down to about 150° C. in order to condense the zirconium tetrachloride as a powder in a condenser. The powder is transferred from the condenser to another processing vessel and further processed. The zirconium tetrachloride powder is very light and tends to bridge in the various processing containers and will not gravity flow from the containers. Thus, the powder must be dug out of the vessels, piping and the like manually.

SUMMARY OF THE INVENTION

It is an object of the present invention to provide a device for promoting gravity flow of non-free-flowing solids from processing containers such as vessels and piping.

With this object in view, the present invention resides in a device having a rotatable shaft with an axial length and a circumference. At least two flexible lengths, such as chains or wire ropes, have first ends attached to and axially spaced on the rotatable shaft and have distal second ends. A collar is slidably mounted on the shaft between the first ends of the flexible lengths, which collar slides axially and circumferentially on the shaft. At least one arm has a first end pivotally attached to the slidable collar and has a second end which is attached to the distal second ends of the flexible lengths. In a preferred embodiment of the present invention, there are two arms.

Advantageously, a device embodying the present invention may be inserted in a container containing bridged solids and the shaft rotated. If the bridged solids do not present significant resistance to the rotating shaft and arm, the pivotally connected arm will extend outwardly and sweep a maximum area. As the solids present ever greater resistance to the rotatable, pivotally connected arm, the arm tends to lag behind the rotating shaft and the flexible lengths begin to wrap about the shaft. As the flexible lengths wrap around the shaft, the second end of the arm is pulled toward the shaft so that the torque required to turn the shaft does not exceed a maximum amount.

DESCRIPTION OF THE DRAWING

The invention will become more readily apparent from the following description of a preferred embodiment thereof shown, by way of example only, in the accompanying drawing which is a schematic drawing of a device embodying the present invention vertically disposed in a vessel.

DESCRIPTION OF A PREFERRED EMBODIMENT

The drawing generally shows a vertical container 10 containing non-free-flowing solids 12, such as zirconium tetrachloride powders. The container 10 has an inlet connection 14 and an outlet connection 16. The container 10 may be a bin, a processing vessel, a pipe or transfer apparatus. The solids may be powders or other particles or even non-newtonian fluids whose rheological properties retard their flow at low shear rates.

The drawing also shows a device 20 embodying the present invention, which is vertically mounted in the container 10. The device 20 has a pedestal 22 which supports a motor frame 24 and a device lifting bail 26. The pedestal 22 and motor frame 24 support a motor 28, a coupling 30, a thrust bearing 32 and a rotatable shaft 34. A motor 28 for unplugging zirconium tetrachloride powder and like solids will need only have a torque of about 200 inch-pounds and less than about one tenth horsepower.

A T-shaped handle 36, which may be fabricated from schedule 40 pipe, is attached to pedestal 22 (as is shown) or to the motor frame 24 or the device bail 26 (not shown) for aligning the device 20 during installation in and removal from the container 10. In addition, the handle 36 may be employed to prevent counter rotation of the device 20 during operation, if necessary in extreme cases.

The rotatable shaft 34 generally has a circumferential surface and an axial length extending from an upper end 40 near the thrust bearing 32 to a lower distal free end 42. The distal end 42 of the shaft 34 is tapered as shown to prevent catching of the device 20 on sharp edges of the container 10 during installation or removal. One or more flexible upper lengths 44 of chains, wire rope and the like have first ends 46 attached to the shaft 34 near the thrust bearing 32. These flexible upper lengths 44 also have distal second ends 48. One or more flexible lower lengths 50 of chains, wire rope and the like have first ends 52 attached to the shaft 34 at a spaced distance from the first ends 46 of the flexible upper lengths 44. These flexible lower lengths 50 have distal second ends 54.

A slidable collar 60 is mounted on the rotatable shaft 34 between the point of attachment of the first ends 46 Of the flexible upper lengths 44 and the point of attachment of the first ends of the flexible lower lengths 50. The collar 60 is entirely free to slide axially and/or circumferentially of the shaft. The collar 60 may be one piece or may be two pieces which are configured to fit around the shaft 34 and then be fastened together by bolts 62 or other like fasteners.

At least one, and preferably two or more, swing arm 70 has a first end 72 pivotally attached to the slidable collar 60 by the bolt 62 or other suitable means. Each swing arm 70 has a second end 74 attached to the second ends 48 and 54 of the flexible upper length 44 and the flexible lower length 50, respectively. As is shown, the slidable collar 60 and pivotally connected first end 72 is disposed above the distal second end 74 of the swing arm.

The device 20 is installed in a container 10 by lowering the device 20 with a crane (not shown) supporting the device 20 by the lifting bail 26. The device 20 is lowered until the pedestal 22 is resting on the container 10 itself or on a flange. The handle 36 may be employed to guide the device 10 through the connection 14 and into the container 10 and to circumferentially orient the device 20.

When the shaft 34 is rotating with substantially no resistance from the solids 12 in the container 10, the sweep arms 70 tend to extend outwardly to the maximum extent permitted by the flexible lengths 44 and 50 as the weight of the collar 60 pushes the first ends 72 of the arms 70 downwardly. As the resistance of the solids 12 against the sweep arms 70 increases, the sweep arms 70 and the collar 60 tend to rotate more slowly than does the shaft 34. The difference in rotation causes the flexible lengths 44 and 50 to begin to wrap around the shaft 34 and the collar 60 to rise. The arms 70 will be drawn inwardly until the weight of the arms 70, the collar 60 and the solids 12 thereon are approximately equal to the resistance presented by the solids 12 to the arms 70, the collar 60 and the flexible lengths 44 and 50. Importantly, the torque on the motor 28 does not exceed a maximum value. The slow rotation of the arms 70 eventually causes the solids 12 to dislodge from the arms 70 and the weight of the collar 60 forces the first ends 72 of the arms 70 downwardly so that the arms 70 tend to sweep a maximum area again. Advantageously, the device 20 is self-cleaning as the relative rotation of the collar 60 on the shaft 34 tends to clean the shaft 34.

While a presently preferred embodiment of the present invention has been described and shown, it is to be distinctly understood that the invention may be otherwise variously embodied within the scope of the following claims.

I claim:

1. In a container with inlet and outlet connections, a device for promoting gravity flow of non-free flowing material from said outlet connection of said container, comprising:

a vertical rotatable shaft having an axial length and a circumferential surface disposed within said container, at least a portion of said axial length extending from said inlet connection to a location adjacent said outlet connection;

means for supporting said shaft at said inlet connection, said shaft having a free end adjacent said outlet connection;

at least two flexible means having respective first ends attached to said shaft at spaced locations along said axial length and having respective second ends;

a collar mounted on said shaft between said attached first ends of said flexible means for axial and rotational movement on said circumferential surface of said shaft;

at least one arm having a first end pivotally attached to said collar and having a second end attached to said respective second ends of said flexible means; and means for rotating said shaft, flexible means and arm, wherein said axial and rotational movement of said collar on said circumferential surface of said shaft is produced by resistance encountered by rotation of said arm and said flexible means within said material in said container.

2. The device of claim 1, comprising a plurality of arms, each arm having a first end pivotally attached to the collar.

3. The device of claim 1, comprising two arms.

4. The device of claim 1, wherein the flexible lengths are chains.

5. The device of claim 1, wherein the shaft supporting means at the inlet connection comprises a pedestal for supporting the shaft in a vertical position; and wherein the collar is disposed above the second end of the arm.

6. The device of claim 1, further comprising a motor and wherein the shaft is coupled with the motor.

* * * * *